United States Patent
Schoeman et al.

[15] 3,666,063
[45] May 30, 1972

[54] POWER UNITS AND PARTS THEREOF

[72] Inventors: Musgrave Schoeman, Pinetown; Herbert Halliday Warmington, Durban, Natal Province, both of Republic of South Africa

[73] Assignee: Straw Engines (Proprietary) Limited, Pietermaritzburg, Province of Natal, Republic of South Africa

[22] Filed: Sept. 4, 1970

[21] Appl. No.: 69,598

[30] Foreign Application Priority Data

Sept. 12, 1969   South Africa..........................69/6487

[52] U.S. Cl..............................192/21, 192/48.92, 74/126, 74/812, 123/18 R
[51] Int. Cl................F16d 21/04, F16h 27/02, F02b 53/00
[58] Field of Search................192/21, 48.92, 51; 74/125.5, 74/126, 812; 123/18 R, 18 A; 91/339, 340; 92/67

[56] References Cited

UNITED STATES PATENTS

| | | | |
|---|---|---|---|
| 1,262,772 | 4/1918 | Giliberti | 74/126 |
| 3,580,228 | 5/1971 | Rocha | 123/18 A |
| 799,946 | 9/1905 | Slocum | 74/126 |
| 102,697 | 5/1870 | Morton | 192/21 |
| 392,610 | 11/1888 | Hoffman | 192/21 |
| 3,026,732 | 3/1962 | Corvisier | 74/125.5 X |
| 3,408,878 | 11/1968 | Bertao | 74/126 |

*Primary Examiner*—Allan D. Herrmann
*Attorney*—Karl W. Flocks

[57] ABSTRACT

The invention concerns a torque converter in which multidirectional input is converted to unidirectional output. The invention also concerns a rotary engine giving multidirectional output in combination with the converter to give unidirectional output therefrom. The converter includes two unidirectional clutches, one reversed with respect to the other, and a reversing means for enabling input in both clockwise and anticlockwise directions to be converted to unidirectional output.

1 Claim, 6 Drawing Figures

Patented May 30, 1972 3,666,063

Inventors:
Musgrave Schoeman
Herbert Halliday Wannington
By
Attorney

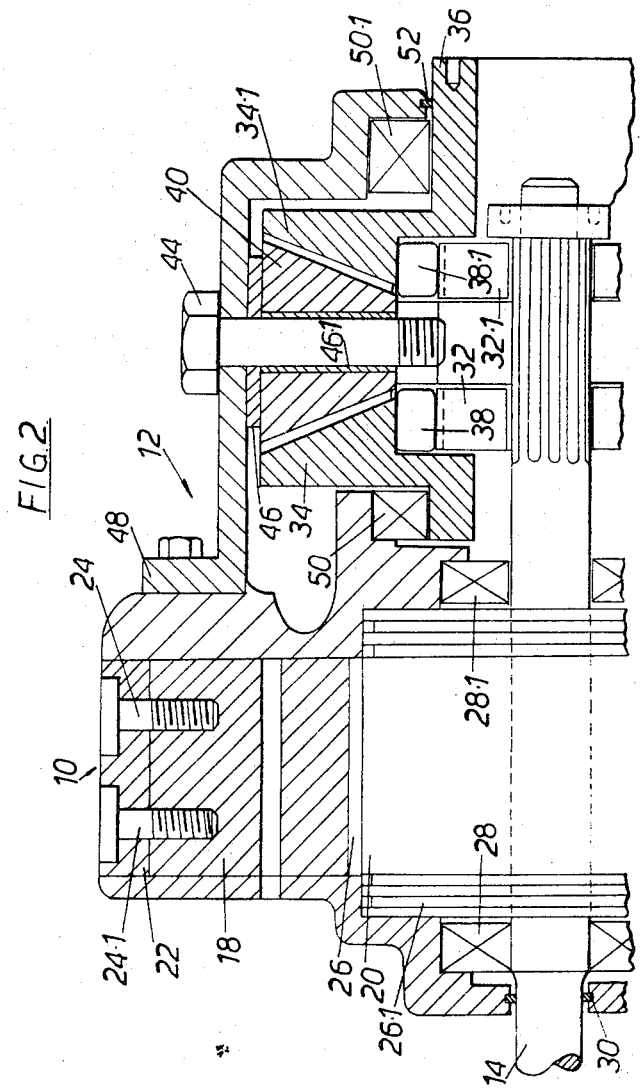

Patented May 30, 1972
3,666,063
4 Sheets-Sheet 4
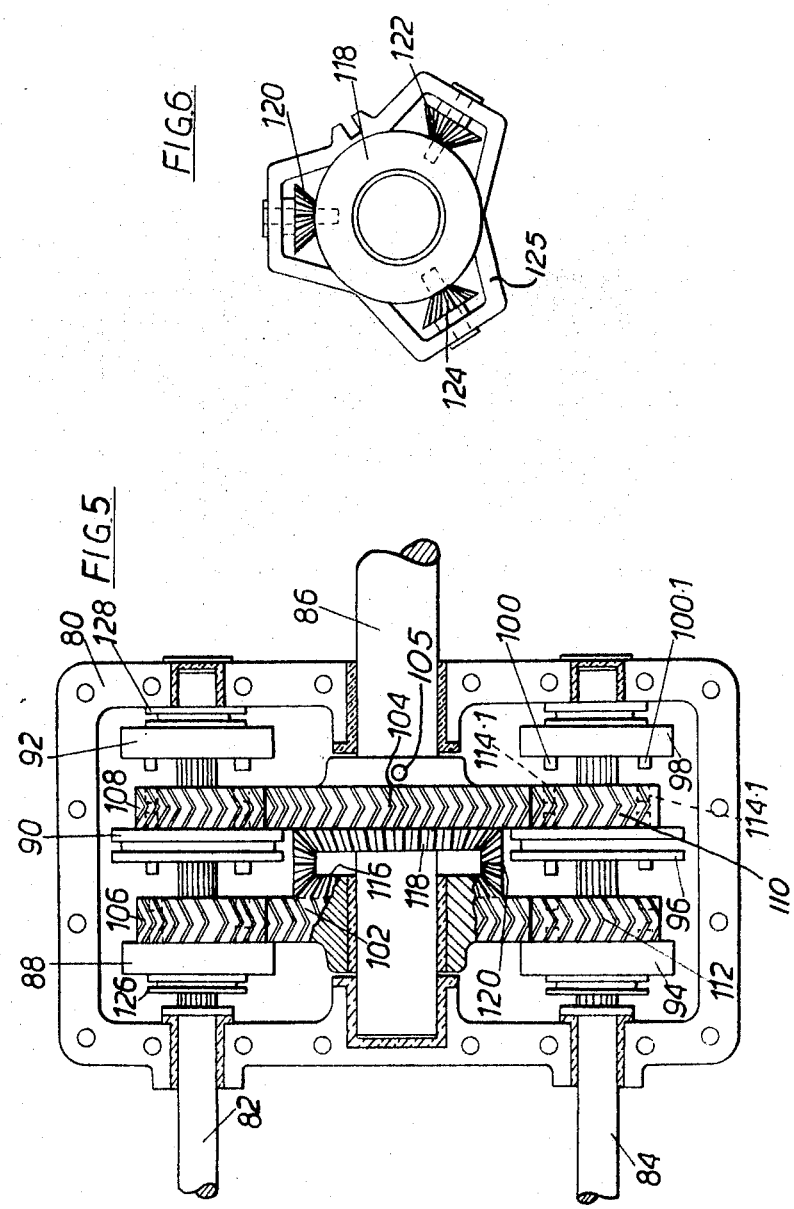

POWER UNITS AND PARTS THEREOF

This invention relates to power units and parts thereof. In particular, the invention relates to a novel torque converter adapted to afford unidirectional output rotation irrespective of the direction or rotation of imput into the torque converter.

The present invention provides a torque converter comprising in combination at least one input shaft, at least one output shaft, a first unidirectional clutch adapted to transmit motion in one direction on rotation of the input shaft, a second unidirectional clutch adapted to transmit motion on rotation of the input shaft in the opposite direction, and means for reversing one of said directions of motion, whereby the output shaft may rotate in a single direction irrespective of the direction of rotation of the input shaft.

The torque converter provided by the invention has many uses where it is desirable to convert rotation in either of two opposite directions into output in one direction. Examples are a coupling between machinery and its ancillaries (e.g. the oil pump drive, or mechanically driven superchargers, on reversable two stroke diesel engines); the coupling on a locomotive speedometer drive to make the speedometer operational in both directions of travel; the conversion into rotational power of the energy of the rise and fall of water, movement of air, etc; a coupling to a reciprocating motor; or a coupling for a pedal-operated drive (e.g. in a boat or bicycle) or a lever-operated drive (e.g. in a rail trolley).

The two unidirectional clutches preferably comprise clutch plates splined on the input shaft. The plates may be thick or thin, depending on the clutches employed. The sprag-type clutch "plates" are preferred. The means for reversing the direction of motion may comprise a pair of ring gears having pinions intermeshing with the teeth thereof. The ring gears may, for example, be spur gears, bevel gears, or the like. Means are provided for enabling the clutch plates to drive one of the ring gears. The drive may be a friction drive which operates in rotation of the clutch plate in only one direction, for example due to the movement of balls, toggles or roller ramps. Unidirectional clutches are well known to the applicants and any suitable unidirectional clutch may be used. Advisably, the clutch plates are biassed away from the ring gears, e.g. by means of springs positioned around the input shaft, so that the biass has to be overcome before the clutch plates make frictional contact with the ring gears.

In one embodiment, there is a single output shaft which is coaxial with a single input shaft, appropriate bearings, oil seals and the like, being provided. In another embodiment the output can be taken off one or more of the pinions positioned between the ring gears, by having an output shaft fast with the pinions.

In one very preferred embodiment at least one input shaft is adapted to drive a further clutch plate, only two of the three clutch plates on that shaft being under load at any given time. Means can be provided for changing the combination of clutch plates under load from one combination to another combination. In this embodiment, the output shaft(s) can be caused to rotate in the opposite direction, so that the direction of output rotation can be changed at will. The clutch plates under load may drive bevel gears and pinions, and interconnected hydraulic means may act axially on the pinions towards their common center so as to obtain even distribution of tooth loading.

A casing is provided around the torque converter, which casing may be filled with oil.

The invention also provides a power unit comprising a torque converter as defined above and at least one thereof, the engine unit(s) being adapted to supply rotation to the input(s) in either of two opposite directions.

The engine unit may be a "rotary engine" having an oscillating vane which describes an arc of less than 360° from rest to rest. Preferably, the oscillating vane is fast with the inner of a pair of concentric cylinders, and a stationary vane is attached to the outer cylinder and extends inwardly to the inner cylinder, the engine volume being defined between the two vanes, the two cylinders and a pair of heads closing the ends of the cylinders. Many engines of this type are described in the literature.

The stationary vane may include inlet and outlet ports for fuel-air mixtures, fluids under pressure, or the like, The engine may be adapted to work by means of a fluid under pressure, for example air, gas or steam under pressure, diesel fuel, or a petrol air mixture in which case the engine incorporates an ignition system.

In order to explain the working of the engine unit, an embodiment of the invention will now be described with particular reference to the use of a petrol-air mixture as fuel, and following a two stroke cycle.

Assuming that the outer cylinder is fixed and its vane is in the 12 O'clock position, a sparking plug will be screwed into a port in the 12 – 1 O'clock position to close that port. Also in about the 1 O'clock position is an exhaust port closed by a valve. At about the 8 O'clock position there is a transfer port to enable fuel in the 8 – 11.30 O'clock segment to pass into the 12.30 – 8 O'clock segment when the vane attached to the inner cylinder is in the 8 O'clock position. An inlet port for fuel may be situated between the 8 and 11.30 O'clock positions, or the transfer port may also act as an inlet port. Starting the engine cycle with the oscillating vane at the 8 O'clock, and the vane moving clockwise, the segmented annulus containing the sparking plug increases in size and fuel is transferred from the 8 – 11.30 O'clock segment to the 12.30–8 O'clock segment. The moving vane is stopped as it reaches about the 11.30 position. This may be effected by a return spring mechanism and/or pressure on the 11.30 – 12 O'clock side thereof and/or by having another engine unit mounted to cause such a stoppage.

As the vane moves back towards the 1 O'clock position any exhaust in the segmented annulus is first scavenged through the open exhaust port. The exhaust port then closes and the fuel in the segmented annulus is compressed in front of the vane while fresh fuel is sucked into the annulus behind the vane for the next stroke. When the vane reaches about the 1 O'clock position, ignition occurs and the combustion explosion causes the vane to move rapidly in a clockwise direction. The exhaust port opens, and the procedure is repeated.

With a view to avoiding leakage at the ends of the cylinder, the vanes and moving (generally inner) cylinder may be fitted with spring biassed sealing strips and rings.

In the case of air, gas or steam under pressure as the fuel, oscillating motion can be effected by admitting such fuel first one side and then the other side of the oscillating vane. A suitable valve arrangement can be provided for this, the valve timing being such that the oscillating vane does not strike the stationary vane, (referred to as a "head"). Inlet/outlet ports would then be provided on either side of the 12 O'clock position, and the transfer port in the 2-stroke type of engine, described above, would be omitted. Preferably two engine units are coupled together through a reverse gear in this embodiment.

In another embodiment, the engine unit may be a 2-stroke type of petrol-air or diesel engine.

In a further embodiment a rotary engine having two or more heads and two or more vanes can be used. In this embodiment one vane undergoes a combustion stroke while the other vane undergoes a compression stroke. If desired fuel injection can be used. The inner (moving) cylinder may have a counterweight to achieve static balancing and offset the weight of the vane. If desired, dynamic balancing may be achieved by coupling a second engine unit to the rotar shaft through suitable reverse bearing, the two oscillating vanes being timed to move away from each other.

In the accompanying drawings, some preferred embodiments of the invention are shown. In these drawings:

FIG. 2 is a partial section through one embodiment of a torque converter according to the invention coupled to an engine unit showing a little over half of the section.

FIG. 5 is a cross-section of a further torque converter according to the invention, and FIG. 6 is a view of gearing in the torque converter of FIG. 5.

Figure 1:
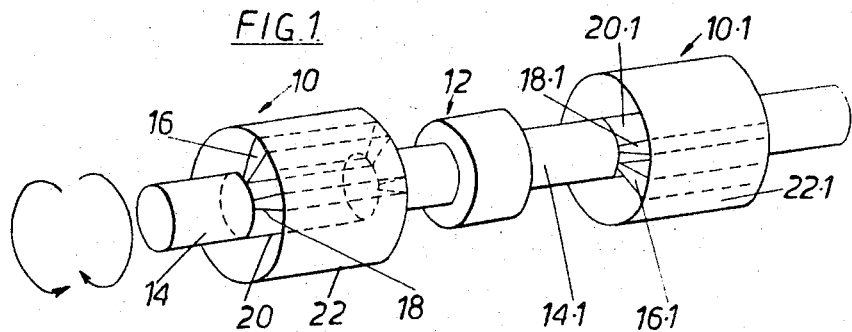
FIG. 1 is a schematic view of the combination of a torque converter according to the invention having two inlets with an engine unit mounted on each to give dynamic stability.

In these figures (see FIG. 1) engine units are shown generally at 10, 10.1 and a torque converter according to the invention at 12. Each engine unit is mounted on a rotor shaft 14, 14.1 and has oscillatable rotary vanes 16, 16.1 and stationary vanes 18, 18.1. The shafts 14, 14.1 are input shafts for the converter 12, the output shaft of which is omitted for simplicity. The rotary vanes are fast with the inner cylinders 20, 20.1 keyed to the shafts 14, 14.1 and the stationary vanes are fast with outer cylinders 22, 22.1.

With reference to FIG. 2, an engine unit 10 comprises inner cylinder 20, outer cylinder 22, stationary vane 18, ports 24, 24.1 and seals 26, 26.1, the rotary vane being omitted for simplicity. Bearings for the engine unit are indicated at 28, 28.1 and an oil seal at 30.

The torque converter 12 comprises clutch plates 32, 32.1 splined to rotar shaft 14. Freely rotatable about the plates 32, 32.1 are bevel gears 34, 34.1. Bevel gear 34.1 is fast with output shaft 36. The bevel gears are separated from the plates 32, 32.1 by rollers 38, 38.1. A pinion 40 intermeshes between the teeth on the bevel gears 34, 34.1 and is held in place by bolt 44, passing through bushes 46.46.1 and through outer oil-filled casing 48. Bearings are shown at 50, 50.1 and an oil seal at 52. As the plates move, the rollers 38, 38.1 run up inclined ramps 53, 53.1 etc. (See FIG. 3) and so drive ring gears 34, 34.1. Due to the bevelled gears and pinions, both plates 32, 32.1 cause the output shaft to rotate continuously in a single direction.

Figure 4:
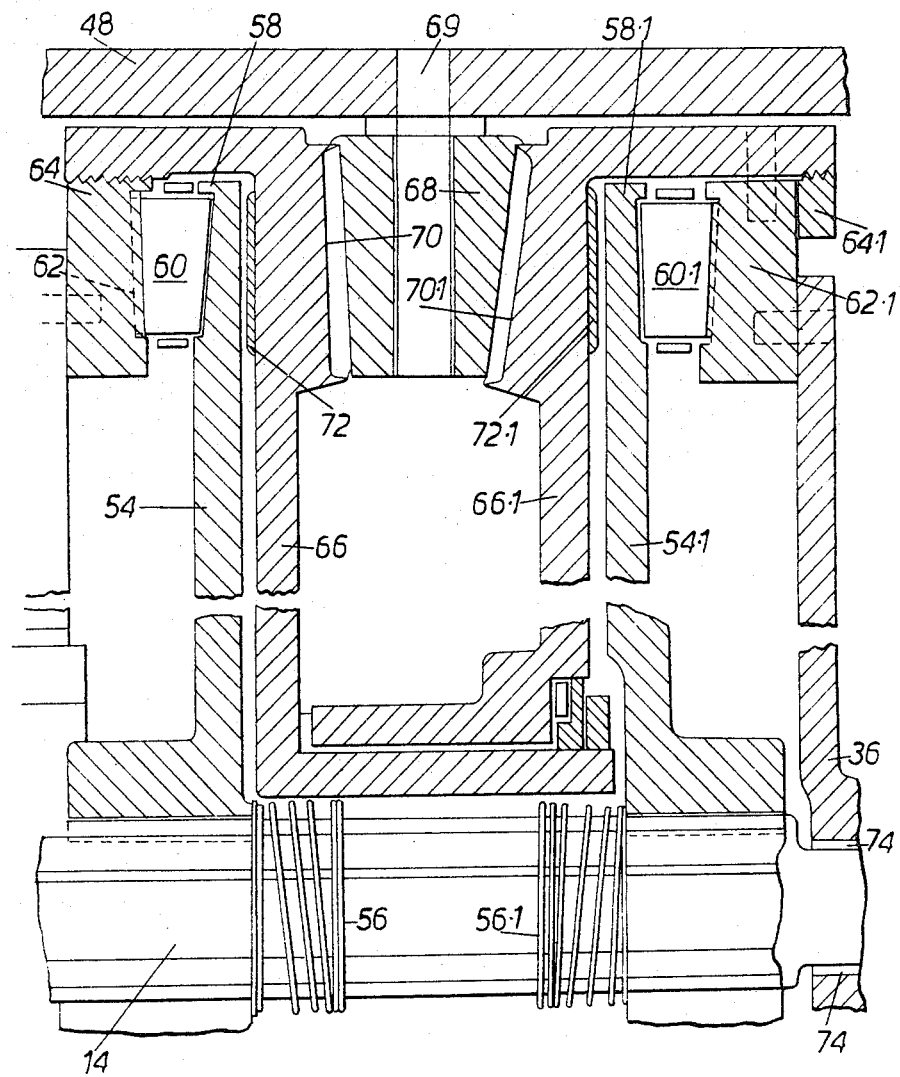
FIG. 4 is a partial cross section through a high torque converter according to the invention.

In the high torque converter of FIG. 4, clutch discs 54, 54.1 are splined to the rotar shaft 14, which is also provided with return springs 56, 56.1. At their periphery the discs 54, 54.1 each have an overhanging lip 58, 58.1 which supports frustoconical roller bearings 60, 60.1 etc. between the discs 54, 54.1 and ramp rings 62, 62.1. The ramp rings 62, 62.1 are attached, via adjustment means 64, 64.1, to bevel gears 66, 66.1. The bevel gears 66, 66.1 each is freely rotatable about the shaft 14. A pinion 68, supported from casing 48 by spindle 69, fits intermeshes with teeth 70, 70.1 on the bevel gears 66, 66.1. Friction linings 72, 72.1 are situated on the side of the bevel gears forming the discs 54, 54.1. Ramp rings 62.1 is connected to output shaft 36. A bushing is shown at 74.

Figure 3:
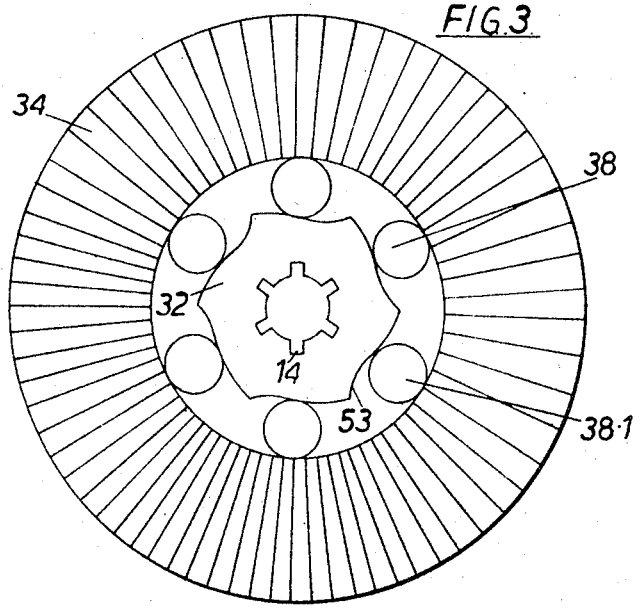
FIG. 3 is a simplified side elevation of the clutch plates in the torque converter of FIG. 2.

As the discs rotate in one direction, one of the roller bearings 60, 60.1(together with the adjacent rollers, not shown) move up ramps similar to those in FIG. 3 and cause the discs to make contact with the friction linings 72, 72.1. The drive in that direction is transferred through the clutch plate and linings to the ring gear and hence to the output shaft 36. As the discs rotate in the opposite direction, the other set of rollers causes the other disc to make contact with its friction lining.

Referring now to FIGS. 5 and 6, an oil-filled casing 80 supports a pair of input shafts 82, 84 and an output shaft 86. Splined on each input shaft are three unidirectional clutches 88, 90, 92, 94, 96, 98, of which one on each shaft (88 and 94) is reversed with respect to the others. Each clutch has engaging dogs 100, 100.1 etc., the center clutches 90 and 96 having engaging dogs on both sides. Only two clutches on each input shaft (clutches 88, 90,94 and 96) in the position shown are operational at any given time.

Mounted on the output shaft 86 are a pair of gearwheels 102, 104. The gearwheel 102 is rotatably mounted on the shaft 86 while the gearwheel 104 is fixedly mounted on the shaft 86 by pin 105, for example. The teeth of gearwheels 102, 104 mesh with teeth of gearwheels 106, 108, 110, 112. These latter-mentioned four gearwheels have slots 114, 114.1 etc. to receive the dogs 100, 100.1 etc. The gearwheels 102, 104, each is fast with a bevel gear 116, 118 interconnected by pinions 120, 122, 124. The pinions 120, 122 and 124 are mounted in a frame 125 which is stationary.

As the input shaft 82 rotates, one of the clutches 88 picks up rotation in one direction and the other clutch 90 picks up rotation in the other direction. Clutch 90 passes the rotation directly to the output shaft 86, while clutch 88 passes the rotation through the gearwheel 102 and pinions 120, 122, 124 to gearwheel 104 on the output shaft 86. Thus, the shaft 86 rotates in one direction.

To cause rotation of shaft 86 in the other direction, clutches 88, 90 and 92 are moved to the left by mechanism (not shown) operating on pulleys 126, 128. At the same time, the clutches 94, 96 and 98 are also moved to the left. The clutches 94, 96, 98 may be moved to the left by just a sufficient amount to disengage the engaged dogs of these clutches from the slots of the gearwheels 110, 112 so that the output is not driven by any of the clutches 94, 96, 98. Further movement of these clutches to the left causes the dogs 100, 100.1, etc. to engage in the slots 114, 114.1, etc. of the gearwheels 110, 112 to cause rotation of the output shaft in the opposite direction.

We claim:

1. A torque converter comprising a casing having mounted therein at least one input shaft, at least one output shaft, a first unidirectional clutch mounted on an input shaft to transmit motion in one direction on rotation of said input shaft, a second unidirectional clutch mounted on the same input shaft to transmit motion on rotation of the input shaft in the opposite direction, means for reversing one of said directions of motion whereby the output shaft may rotate in a single direction irrespective of the direction of rotation of the input shaft, and an output shaft reversing means comprising a third unidirectional clutch mounted on the said input shaft to transmit rotation in the same direction as the first unidirectional clutch from the said input shaft to drive the output shaft in the opposite direction to that driven by the first unidirectional clutch, only one of the first and third unidirectional clutches being operable at any one time.

* * * * *

UNITED STATES PATENT OFFICE
CERTIFICATE OF CORRECTION

Patent No. 3,666,063             Dated May 30, 1972

Inventor(s) Musgrave Schoeman and Herbert Halliday Warmington

It is certified that error appears in the above-identified patent and that said Letters Patent are hereby corrected as shown below:

Column 1, line 5 should read:

[73] Assignee: Staw Engines (Proprietary) Limited,

Signed and sealed this 3rd day of October 1972.

(SEAL)
Attest:

EDWARD M. FLETCHER, JR.
Attesting Officer

ROBERT GOTTSCHALK
Commissioner of Patents